UNITED STATES PATENT OFFICE.

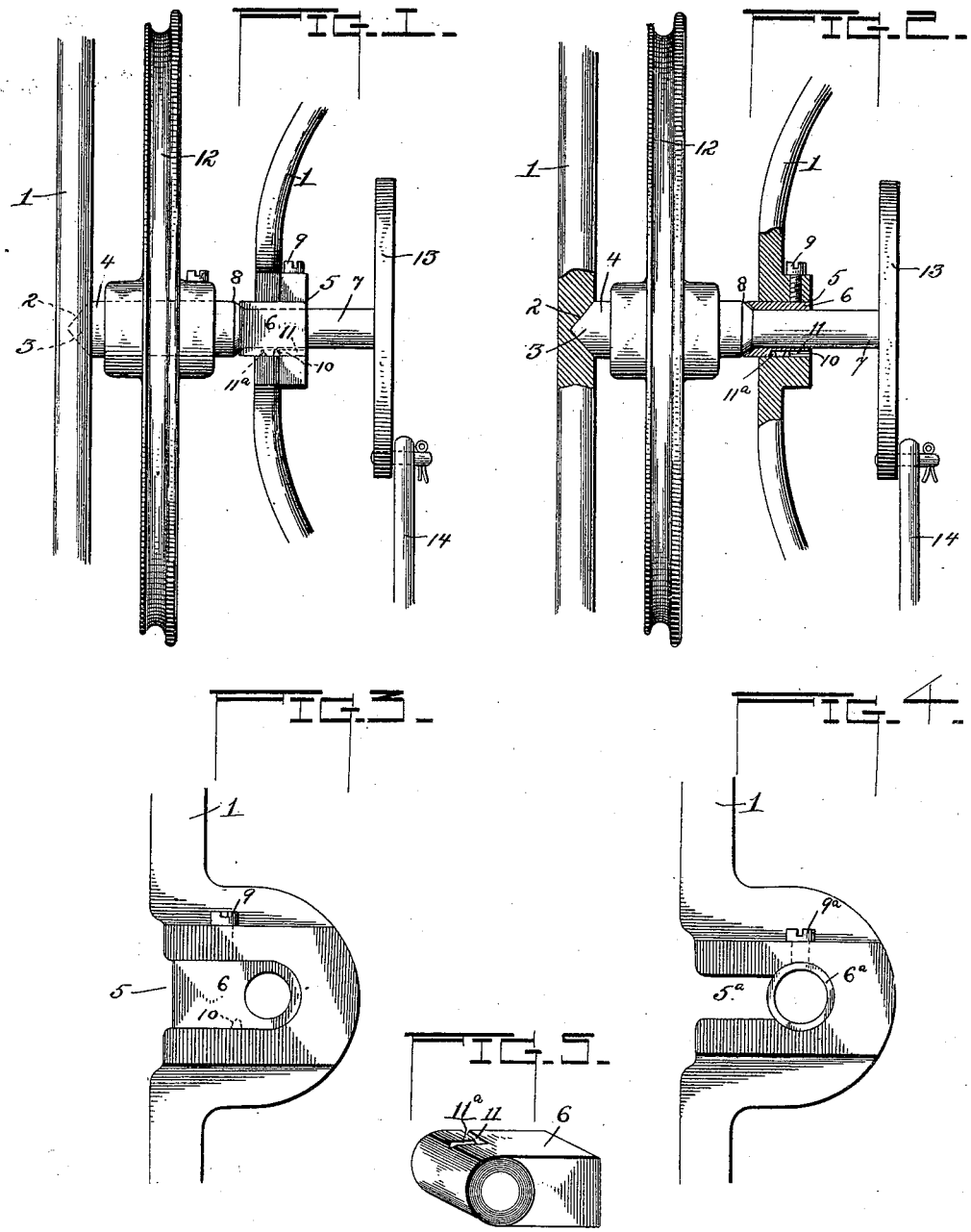

WILLIAM HENRY STRICKLER, OF ROANOKE, VIRGINIA.

COMPENSATING BEARING FOR SEWING-MACHINES.

SPECIFICATION forming part of Letters Patent No. 565,521, dated August 11, 1896.

Application filed March 31, 1896. Serial No. 585,615. (No model.)

*To all whom it may concern:*

Be it known that I, WILLIAM HENRY STRICKLER, a citizen of the United States, residing at Roanoke, in the county of Roanoke and State of Virginia, have invented a new and useful Compensating Bearing for Sewing-Machines and other Machinery, of which the following is a specification.

The purpose of this invention is to provide a bearing for shafting generally, and particularly for the shafts of the fly or drive wheel of sewing-machines, scroll-saws, lathes, and other machinery, which will enable any looseness occasioned by wear being readily taken up, so that the shaft will run steady and noiseless, and which at the same time will provide for the removal of the shaft when required for cleaning, repairing, or other desired purpose.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a detail view of a portion of a machine-frame supporting the fly-wheel and having the invention applied. Fig. 2 is a view similar to Fig. 1, partly in section. Fig. 3 is a side elevation of that portion of the frame supporting the compensating bearing. Fig. 4 shows a different arrangement of the parts. Fig. 5 is a detail view of the compensating bearing.

Corresponding and like parts are referred to in the following description and indicated in the several views of the drawings by the same reference-characters.

The machine-frame 1 is formed with a conical depression 2, receiving the conical end 3 of the fly-wheel shaft 4, and has an opening or slot 5 to receive the compensating bearing 6, which receives the reduced portion 7 of the fly-wheel shaft and has the end facing the recess or depression 2 made flaring to receive the conical shoulder 8, formed between the body portion of the shaft and the reduced portion 7 or provided in any convenient way. The bearing 6 is adjustable in the opening 5, and is held in place by a binding-screw 9, let into a threaded opening in a boss or lateral flange reinforcing the part of the frame surrounding the opening 5. The opening 5 has parallel sides, and its closed end is made rounding, and one of the sides is formed with a nib or key 10 to enter a corresponding groove 11 in the side of the bearing, so as to retain the latter in position should the binding-screw 9 become accidentally loosened. The bearing 6 has an endwise movement in the opening 5 and is movable upon the reduced portion 7 of the fly-wheel shaft both to take up wear and to release the shaft and bearing when it is required to remove the shaft 4 for any purpose. This latter result is attained by moving the bearing 6 upon the reduced part 7 until it clears the opening 5 or a transverse groove $11^a$, intersecting with the groove 11, registers with the key 10, after which the shaft can be displaced, as will be readily understood. The fly-wheel 12 is secured upon the shaft 4, as also the crank 13, in any convenient way, and power is transmitted to the part to be operated by means of a band passing around the fly-wheel 12 in the usual way, and the shaft is driven from a treadle by means of a pitman 14, operatively connected with the crank 13, or in any convenient way.

As shown in Fig. 4, the opening $5^a$ is contracted and the compensating bearing $6^a$ is a sleeve and is held in the opening $5^a$ by the contracted portion or sides thereof, the said bearing being held in the adjusted position by a binding-screw $9^a$ in the usual way.

Having thus described the invention, what is claimed as new is—

1. In combination, a frame having a conical depression and an opening in alinement, a shaft having a conical end obtaining a bearing in the conical depression and having a conical shoulder between its ends, a compensating bearing movable endwise in the aforesaid opening and upon the portion of the shaft exterior to the conical shoulder, and having the end adjacent to the latter made flaring to snugly fit the same, and means for holding the compensating bearing in the adjusted position, substantially as and for the purpose set forth.

2. In combination, a frame having a conical depression and a parallel-sided opening in line with the conical depression, a shaft having a conical end operating in the conical depression and formed with a conical shoulder between its ends, a nib on one side of the said opening, a compensating sleeve movable endwise in the said opening and upon the shaft exterior to the conical shoulder, and having the end of its bore flared to receive the said conical shoulder, and having a transverse and a longitudinal groove in one side intersecting with each other and adapted to receive the said nib, and means for securing the sleeve in the opening, substantially as and for the purpose set forth.

3. In combination, a frame having a conical depression and an opening in alinement, a shaft having a conical end entering the conical depression and formed with a conical shoulder between its ends, a wheel secured upon the shaft between the conical end and shoulder, a crank secured to the shaft exterior to the conical shoulder, a sleeve or compensating bearing movable endwise in the aforesaid opening and upon the shaft exterior to the conical shoulder, and adapted to interlock with the said opening, and having its bore flaring to receive the said conical shoulder, and a binding-screw for holding the bearing in an adjusted position, the parts being combined to provide for taking up wear and to enable the removal of the shaft, substantially as and for the purpose set forth.

In testimony that I claim the foregoing as my own I have hereto affixed my signature in the presence of two witnesses.

WILLIAM HENRY STRICKLER.

Witnesses:
 JOHN H. SIGGERS,
 THEODORE DALTON.